US012776654B2

(12) United States Patent
Baerd et al.

(10) Patent No.: US 12,776,654 B2
(45) Date of Patent: Oct. 27, 2026

(54) POWER SUPPLY DEVICE AND ASSOCIATED VARIABLE FREQUENCY DRIVE AND METHOD

(71) Applicant: GE ENERGY POWER CONVERSION TECHNOLOGY LIMITED, Warwickshire (GB)

(72) Inventors: Henri Baerd, Villebon-sur-Yvette (FR); Thufail Elenjickail Abdul Azeez, Villebon-sur-Yvette (FR); Nicolas Gruau, Villebon-sur-Yvette (FR)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 14 days.

(21) Appl. No.: 18/954,210

(22) Filed: Nov. 20, 2024

(65) Prior Publication Data

US 2025/0286398 A1 Sep. 11, 2025

(30) Foreign Application Priority Data

Feb. 19, 2024 (EP) .................................... 24158313

(51) Int. Cl.
*H02M 1/32* (2007.01)
*H02J 7/00* (2006.01)
(Continued)

(52) U.S. Cl.
CPC ................ *H02J 7/345* (2013.01); *H02J 7/02* (2013.01); *H02J 7/855* (2026.01); *H02P 27/06* (2013.01); *H02J 2207/50* (2020.01)

(58) Field of Classification Search
CPC ........... H02J 7/345; H02J 7/0063; H02J 7/02; H02M 5/4585; H02M 1/36; H02M 7/539; H02M 1/10; H02M 1/08
(Continued)

(56) References Cited

U.S. PATENT DOCUMENTS 9,941,702 B2 4/2018 Abido et al.
10,516,263 B2 12/2019 Nordin et al.
(Continued)

FOREIGN PATENT DOCUMENTS

EP 2724439 A2 4/2014
WO 2013003357 A2 1/2013

OTHER PUBLICATIONS

Extended European Search Report for EP Application No. EP24158313.7 dated Jul. 30, 2024, 9 pages.

*Primary Examiner* — Rexford N Barnie
*Assistant Examiner* — Swarna N Chowdhuri
(74) *Attorney, Agent, or Firm* — WOOD IP LLC

(57) ABSTRACT

Provided is a power supply device for a variable frequency drive, a drive system and a method for supplying the same, the power supply device includes a switch and an energy storage device having an additional impedance and an energy storage means, a loading means to load the energy storage means when the switch is open so that the voltage of the energy storage means is equal to a loading voltage value equal to the sum of a DC maximal value and a voltage threshold, and maintain the load of the energy storage means when the switch s open so that the voltage of the energy storage means is equal to the loading voltage value, and a control means to close the switch when a DC link voltage of the variable frequency drive is equal or smaller than a DC minimal value minus a predetermined voltage value.

15 Claims, 5 Drawing Sheets

(51) Int. Cl.

| | |
|---|---|
| ***H02J 7/02*** | (2016.01) |
| ***H02J 7/34*** | (2006.01) |
| ***H02M 1/36*** | (2007.01) |
| ***H02M 5/458*** | (2006.01) |
| ***H02P 27/06*** | (2006.01) |

(58) Field of Classification Search
USPC ........................................................ 307/64
See application file for complete search history.

(56) References Cited

U.S. PATENT DOCUMENTS

2011/0267013 A1* 11/2011 Marken .................... H02J 3/30 323/204
2016/0087443 A1* 3/2016 Ballantine ............ H02J 3/0073 307/82
2023/0420979 A1* 12/2023 Yamak ..................... H02J 7/50

* cited by examiner

POWER SUPPLY DEVICE AND ASSOCIATED VARIABLE FREQUENCY DRIVE AND METHOD

CROSS-REFERENCE TO RELATED APPLICATIONS

This application claims priority to European Patent Application Serial Number EP24158313.7, filed Feb. 19, 2024, which is herein incorporated by reference.

TECHNICAL FIELD

The present invention relates to the field of power supplies.

The present invention relates more particularly to a power supply device for a variable frequency drive, a variable frequency drive comprising such a power supply device and a method for operation such a power supply device.

BACKGROUND

Generally, a variable frequency drive VFD commands an electric machine to generate a torque from a grid delivering electric power supply.

The VFD comprises for example a rectifier connected to the grid, a direct current DC link supplied by the rectifier, and a power inverter supplied by the DC link. The power inverter supplies the electric machine with power.

The electric machine works in motor mode to drive, for example a turbomachine which may be a compressor or a pump.

The driven turbomachine may be used to implement a critical process requiring that the electric machine permanently delivers a torque having a minimal no nil value to avoid a risk of trip of the driven turbomachine.

Grid disturbances may cause short voltage dips, for example between 20 ms and 200 ms, so that the voltage of the DC link decreases.

The VFD may deliver not enough power to the electric machine to drive the turbomachine during voltage dips and may loss controllability of the electric machine.

The torque delivered by the electric machine during voltage dips decreases which may cause a trip of the driven turbomachine.

To continue to supply the electric machine to generate enough torque during voltage dips, it is known to supply the DC link with energy stored in energy storage means.

The energy storage means are connected to an auxiliary power converter.

The auxiliary power converter is connected to the DC link and supplies the DC link during voltage dips.

However, the implementation of the auxiliary power converter increases the size, the weight, and the cost of the VFD.

Further, the implementation of the auxiliary power converter deteriorates the reliability of the VFD.

It is also known to directly connect the energy storage means to the DC link, without an auxiliary power converter.

The storage capacity of the energy storage means may be determined so that the voltage of the DC link remains noticeably constant.

As the power delivered by the power inverter is for example equal to 10 MW, the energy storage means need to be oversized to store a large amount of energy increasing the size, the weight, and the cost of the VFD.

When the energy storage means are directly connected to the DC link and in order not to oversize the energy storage means, it is also known to oversize the VFD and the electric machine so that the electric machine delivers the minimal required torque to avoid tripping of the turbomachine when the DC link voltage reaches a minimal value at the end of a predetermined duration of a voltage dip.

However, oversizing the VFD and the electric machine increases the size, the weight, and the cost of the VFD and the electric machine.

It is therefore proposed to provide a method and power supply device to overcome wholly or partially this disadvantage.

SUMMARY

In view of the foregoing, provided is a method for supplying a variable frequency drive including a DC link including a first bus and a second bus, and a power inverter connected to the DC link, a power supply device including a switch and an energy storage device, the energy storage device including an additional impedance and energy storage means, a first connection of the energy storage device being connected to the first bus and a second connection of the energy storage device being connected to a first end of the switch, the second end of the switch being connected to the second bus, the DC link supplying the power inverter with a DC voltage equal to a DC nominal voltage value included between a DC minimal value and a DC maximal value, the DC maximal value being bigger than the DC minimal value, the switch being open so that no current flows through the switch. The method includes loading the energy storage means when the switch is open so that the voltage of the energy storage means is equal to a loading voltage value equal to the sum of the DC maximal value and a voltage threshold, maintaining the load of the energy storage means when the switch is open so that the voltage of the energy storage means is equal to the loading voltage value, and closing the switch when the DC link voltage is equal or smaller than the DC minimal value minus a predetermined voltage value to supply the DC link with an energy flow from the energy storage device, the energy flow value being positive as long as the energy storage device supplies the DC link.

According to an embodiment, the method further includes opening the switch when the energy flow supplied by the energy storage device is smaller or equal to a positive predetermined value.

Advantageously, the method includes opening the switch when the energy flow supplied by the energy storage device is equal or smaller than a negative predetermined value.

Another embodiment of the invention relates to a power supply device for variable frequency drive including a power inverter connected to a DC link, the DC link including a first bus and a second bus and being configured to supply the power inverter with a DC voltage equal to a DC nominal voltage value included between a DC minimal value and a DC maximal value, the DC maximal value being bigger than the DC minimal value, the power supply device comprising a switch and an energy storage device, the energy storage device including an additional impedance and energy storage means, and a first connection of the energy storage device being configured to be connected to the first bus and a second connection of the energy storage device being connected to a first end of the switch, the second end of the switch being configured to be connected to the second bus.

The power supply device includes a loading means configured to load the energy storage means when the switch is open so that the voltage of the energy storage means is equal to a loading voltage value equal to the sum of the DC maximal value and a voltage threshold, and maintain the load of the energy storage means when the switch is open so that the voltage of the energy storage means is equal to the loading voltage value, and control means configured to close the switch when the DC link voltage is equal or smaller than the DC minimal value minus a predetermined voltage value to supply the DC link with an energy flow from the energy storage device, the energy flow value being positive as long as the energy storage device supplies the DC link.

Advantageously, the switch is configured to be opened when the energy flow supplied by the energy storage device is smaller or equal to a positive predetermined value.

According to an embodiment, the switch is configured to be opened when the energy flow supplied by the energy storage device is equal or smaller than a negative predetermined value.

According to an embodiment, the switch includes a static bidirectional switch.

According to an embodiment, the switch includes a static unidirectional switch.

Advantageously, the switch includes at least one thyristor, the anode of the thyristor being connected to the first end of the switch and the cathode of the thyristor being connected to the second end of the switch.

Preferably, the energy storage device includes a supercapacitor.

Advantageously, the energy storage means includes at least one capacitor connected in series with the additional impedance.

Preferably, the energy storage means includes at least one battery connected in series with the additional impedance.

Another embodiment of the invention relates to a variable frequency drive including a power inverter connected to a DC link, the DC link including a first bus and a second bus and being configured to supply the power inverter with a DC voltage equal to a DC nominal voltage value included between a DC minimal value and a DC maximal value, the DC maximal value being bigger than the DC minimal value, and a power supply device as defined above, connected to the first bus and a second bus.

Advantageously, the variable frequency drive further comprises a rectifier configured to be connected to a grid and connected to the DC link to supply the DC link with the DC voltage.

According to an embodiment, the rectifier is a diode rectifier.

Another embodiment of the invention relates to a drive system including a variable frequency drive as defined above, and an electric machine connected to the power inverter of the variable frequency drive.

BRIEF DESCRIPTION OF THE DRAWINGS

Other characteristics and advantages of the invention will emerge on reading the following description of embodiments of the invention, provided solely by way of non-limiting examples and with reference to the drawings in which.

DETAILED DESCRIPTION

Figure 1:
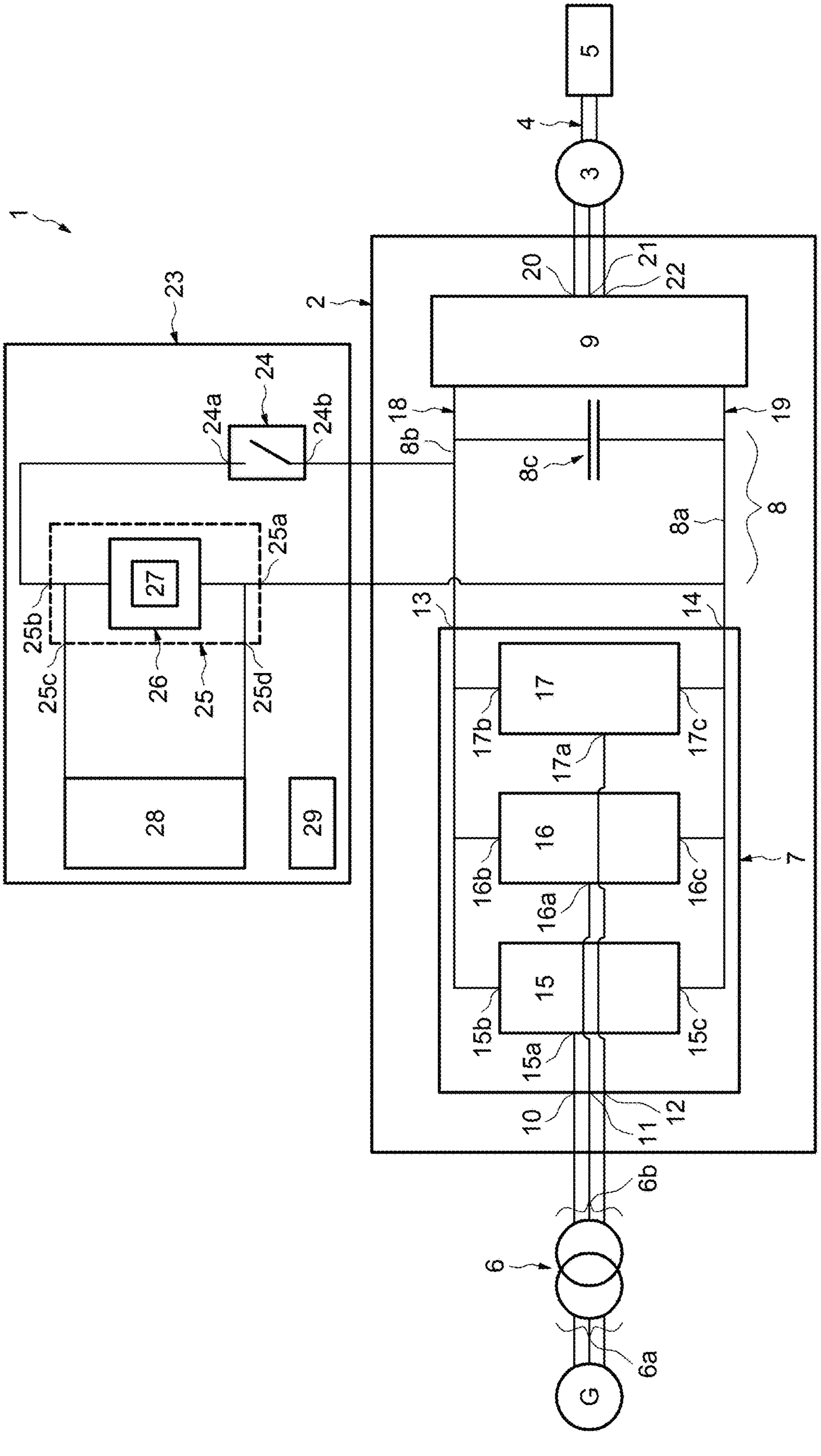
FIG. 1 illustrates schematically an embodiment of a drive system according to the invention.

FIG. 1 illustrates schematically an embodiment of a drive system 1.

The drive system 1 comprises a variable frequency drive VFD 2 and an electric machine 3 connected to the VFD 2.

The electric machine 3 comprises a rotor shaft 4 connected to a load 5.

The load 5 comprises for embodiment a turbomachine, for example a pump or a compressor.

The VFD 2 is connected to a grid G through a transformer 6.

A primary circuit 6*a* of the transformer 6 is connected to the grid G and a secondary circuit 6*b* of the transformer 6 is connected to the VFD.

The grid G may comprise N phase(s) and the electric machine 3 may comprise M phases, N and M being non nil integers, M being at least equal to two.

It is assumed in the following that N and M are equal to three, the grid G being a triphasic grid and the electric machine 3 being a triphasic machine, and that each circuit of the primary circuit 6*a* and secondary circuit 6*b* comprises three phases.

Each circuit of the primary circuit 6*a* and secondary circuit 6*b* may comprise more or less than three phases.

The VFD 2 comprises a rectifier 7, a direct current DC link 8 and a power inverter 9.

The DC link 8 comprises a first bus 8*a*, a second bus 8*b* and a capacitor 8*c* connected to the first and second buses 8*a*, 8*b*.

As the secondary circuit 6*b* comprises three phases, the rectifier 7 comprises three inputs 10, 11, 12, each input being connected to a phase of the secondary circuit 6*b*.

In another embodiment, the grid G is connected directly to the inputs 10, 11, 12 of the rectifier 7, without the transformer 6.

The rectifier 7 further comprises a first output 13 connected to a first end of the second bus 8*b* and a second output 14 connected to a first end of the first bus 8*a*.

The rectifier 7 may comprise a same number of bridges 15, 16, 17 as the number of inputs 10, 11, 12 of the rectifier 7.

Each bridge 15, 16, 17 comprises a first connection 15*a*, 16*a*, 17*a* connected to an input 10, 11, 12 of the rectifier 7, a second connection 15*b*, 16*b*, 17*b* connected to the first output 13 of the rectifier 7 and a third connection 15*c*, 16*c*, 17*c* connected to the second output 14 of the rectifier 7.

When the secondary circuit 6*b* of the transformer 6 comprises more than three phases, the person skilled in the art may arrange the structure of the rectifier 7 with series or parallel connections of bridges as known from the prior art.

A second end of the first and second buses 8*a*, 8*b* are connected to inputs 19, 18 of the power inverter 9.

The power inverter 9 comprises a same number of outputs 20, 21, 22 as the number of phases M of the electric machine 3, each output 20, 21, 22 being connected to a phase of the machine 3.

The drive system 1 further comprises a power supply device 23 comprising a switch 24, an energy storage device 25 including energy storage means 26 and an additional impedance 27, loading means 28 and control means 29.

The energy storage device 25 comprises for example a supercapacitor having an embedded impedance, the embedded impedance being the additional impedance 27.

The energy storage device 25 comprises a first connection 25*a* connected to the first bus 8*a*, a second connection 25*b* connected to a first end 24*a* of the switch 24, a third connection 25*c* and a fourth connection 25*d* both connected to the loading means 28.

The second end 24*b* of the switch 24 is connected to the second bus 8*b*.

The loading means 28 comprise for example an auxiliary power converter to deliver a DC current to load the energy storage means 26 when the switch 24 is open and to maintain the load of the energy storage means when the switch 24 is open so that the voltage of the energy storage means 26 is equal to a loading voltage value.

The control means 29 are intended to command the switch 24 and may be intended to command the loading means 28.

The control means 29 comprise for example a processing unit.

Figure 2:
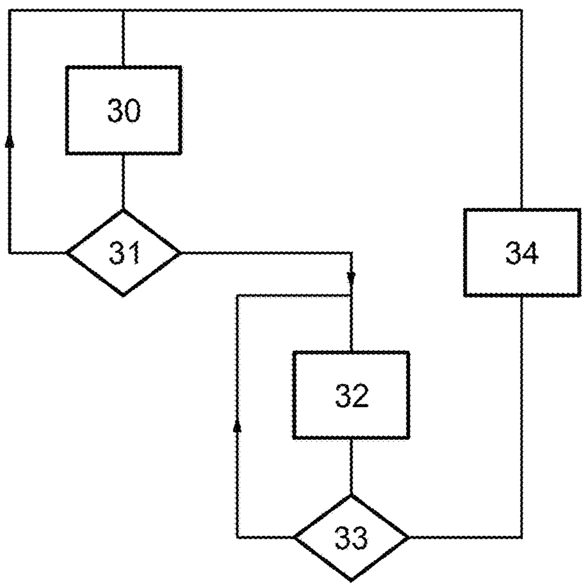
FIG. 2 illustrates schematically a first embodiment of a method to control the drive system according to the invention.

FIG. 2 illustrates schematically a first example of a method to control the drive system 1.

It is assumed that the grid G supplies the rectifier 7 through the transformer 6 with a triphasic alternating current AC and that the switch 24 is open so that no current flows through the switch 24.

The rectifier 7 rectifies the AC current and supplies the DC link 8 so that the DC voltage between the first and second bus 8*a*, 8*b* is equal to a DC nominal voltage value included between a DC minimal value and a DC maximal value, the DC maximal value being bigger than the DC minimal value.

The DC minimal value is equal to the minimal voltage value delivered by the grid G in absence of a voltage dip multiplied by the ratio of voltage transformation of the transformer 6 and the rectification factor of the rectifier 7.

The DC maximal value is equal to the maximal voltage value delivered by the grid G multiplied by the ratio of voltage transformation of the transformer 6 and the rectification factor of the rectifier 7.

During a step 30, the switch 24 is open and the loading means 28 load the energy storage means 26 so that the voltage of the energy storage means 26 is equal to the loading voltage value and maintain the load of the energy storage means 26 so that the voltage of the energy storage means 26 is equal to the loading voltage value.

The loading voltage value is equal to the sum of the DC maximal value and a voltage threshold.

The voltage threshold is for example equal to 10% of the DC maximal value.

As long as the voltage of the DC link 8 is bigger than the DC minimal value minus a predetermined voltage value (step 31), the method goes back to step 30.

The predetermined voltage value may be nil.

When the voltage of the DC link 8 is equal or smaller than the DC minimal value minus the predetermined voltage value (step 31), during a step 32, the control means 29 close the switch 24 so that the energy storage device 25 supplies the DC link 8.

The voltage of the DC link 8 equal or smaller than the DC minimal value minus the predetermined voltage value is representative of a voltage dip of the grid G.

The energy storage device 25 supplies the DC link 8 with an energy flow.

The control means 29 monitor the energy flow.

The energy flow value is positive as long as the energy storage device 25 supplies the DC link 8.

When the energy flow value is positive or nil, the energy storage device 25 operates as a source of energy and supplies the DC link 8.

When the energy flow value is negative, the energy storage device 25 operates as a receiver of energy and is supplied by the DC link 8.

The DC link 8 is supplied by the energy storage device 25 having a voltage at least equal to the DC minimal voltage.

As the energy storage device 25 comprises the additional impedance 27, the inrush current generated during the closing of the switch 24 by the connection of the energy storage means 26 having a voltage equal to the loading voltage and the DC link 8 having a voltage equal or smaller than the DC minimal value minus the predetermined voltage value is limited.

The energy storage device 25 may be designed so that the additional impedance 27 is chosen so that the inrush current is for example equal to maximal two times the nominal current.

As the inrush current is for example equal to maximal two times the nominal current, the power inverter 9, the capacitor 8, the energy storage device 25 and the switch 24 are made from standard components reducing the complexity to realize the power inverter 9, the capacitor 8, the energy storage device 25 and the switch 24 and reducing the costs.

As a supercapacitor comprises intrinsically an embedded impedance, the arrangement of power modules forming the supercapacitor may be determined so that the additional impedance 27 of the energy storage device 25 which is the embedded impedance of the supercapacitor is designed to limit the inrush current to the chosen inrush current value.

The energy storage means 26 are further designed so that the energy stored is enough to supply the power inverter 9 during the duration of at least one voltage dip, for example for 200 ms.

The amount of energy stored in the energy storage means 26 is determined from the duration of a reference voltage dip, the number of reference voltage dip(s) before charging the energy storage means 26 and the power supplied to the electric machine 3 so that the torque generated by the electric machine 3 is enough to drive the load 5 without dysfunction.

As long as the energy storage device 25 supplies the DC link 8 with the energy flow having a positive energy flow value larger than a positive predetermined value (step 33), the method goes back to step 32.

The positive predetermined value is for example equal to 5% of the nominal power of the electric machine 3.

The energy flow is for example determined by the control means 29 from measurements of the current flowing in the switch 24 and the voltage on the DC link 8 or the voltage on the energy storage device 25.

The current flowing in the switch 24 may be measured by a current sensor connected to the control means 29. The voltage on the DC link 8 or the voltage on the energy storage device 25 may be measured by a voltage sensor connected to the control means 29.

In another embodiment, the energy flow may be determined from a model of the energy storage device 25, the evolution of a voltage and the instantaneous value of the said voltage, the said voltage being the voltage on the DC link 8 or the voltage on the energy storage device 25.

In another embodiment, the energy flow may be determined from a model of the energy storage device 25, the evolution of the current flowing in the switch 24 and the instantaneous value of the current flowing in the switch 24.

When the energy flow supplied by the energy storage device 25 is smaller or equal to the positive predetermined value (step 33), in a step 34, the switch 24 is opened and the method goes back to step 30.

The loading means 28 load the energy storage means 26 when the switch 24 is open and maintain the load of the energy storage means when the switch 24 is open so that the voltage of the energy storage means 26 is equal to the loading voltage value.

The electric machine 3 is supplied by the grid G.

During a voltage dip, the electric machine 3 is supplied by the energy storage device 25 having a voltage at least equal to the DC minimal voltage so that the DC link voltage is between at least the DC minimal voltage and the DC maximal voltage so that the power inverter 9 and the electric machine 3 need not to be oversized to run at a DC link voltage smaller that the DC minimal voltage.

The auxiliary power converter 28 is designed to load the energy storage means 26 requiring less power than to supply the DC link 8 so that the size, the weight and the cost of the auxiliary power converter 28 is reduced compared to the auxiliary power converter known from the prior art.

During steps 32 and 33, the loading means 28 may remain loading the energy storage means 26 or may stop to load the energy storage means 26.

Figure 3:
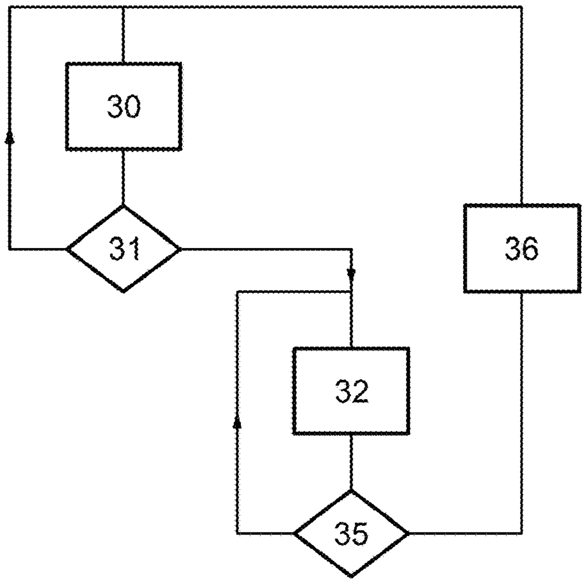
FIG. 3 illustrates schematically a second embodiment of the method to control the drive system according to the invention.

FIG. 3 illustrates schematically a second embodiment of the method to control the drive system 1.

It is assumed that the grid G supplies the rectifier 7 through the transformer 6 with a triphasic alternating current AC and that the switch 24 is open so that no current flows through the switch 24.

The rectifier 7 rectifies the AC current and supplies the DC link 8 so that the DC voltage between the first and second bus 8*a*, 8*b* is equal to a DC nominal voltage value included between a DC minimal value and a DC maximal value, the DC maximal value being bigger than the DC minimal value.

The DC minimal value is equal to the minimal voltage value delivered by the grid G in absence of a voltage dip multiplied by the ratio of voltage transformation of the transformer 6 and the rectification factor of the rectifier 7.

The DC maximal value is equal to the maximal voltage value delivered by the grid G multiplied by the ratio of voltage transformation of the transformer 6 and the rectification factor of the rectifier 7.

The control means 29 monitor the energy flow.

The second embodiment of the method comprises the steps 30, 31 and 32 as described above.

The second embodiment of the method differs from the first embodiment of the method illustrated on FIG. 2 in that the step 33 is replaced by a step 35 and that the step 34 is replaced by a step 36.

In step 35, the energy flow delivered by the energy storage device 25 is compared to a negative predetermined value.

The absolute value of the negative predetermined value is for example equal to 20% of the nominal power of the rectifier 7.

During steps 32 and 35, the loading means 28 may remain loading the energy storage means 26 or may stop to load the energy storage means 26.

As long as the energy flow delivered by the energy storage device 25 is bigger than the negative predetermined value, the method goes back to step 32. When the energy flow delivered by the energy storage device 25 has a negative value, the grid G supplies the energy storage device 25.

When the energy flow delivered by the energy storage device 25 is equal or smaller than the negative predetermined value, the method continues at step 36.

During the step 36, the control means 29 open the switch 24.

The loading means 28 load the energy storage means 26 when the switch 24 is open and maintain the load of the energy storage means when the switch 24 is open so that the voltage of the energy storage means 26 is equal to the loading voltage value.

The switch 24 is opened when the energy flow delivered by the energy storage device 25 is equal or smaller than the negative predetermined value so that the energy storage means 26 are partially loaded by the rectifier 7 supplying more power than the auxiliary power converter 28 to load faster the energy storage means 26 during a duration between a first instant when the energy flow delivered by the energy storage device 25 is nil and a second instant when the energy flow delivered by the energy storage device 25 is equal or smaller than the negative predetermined value.

Figure 4:
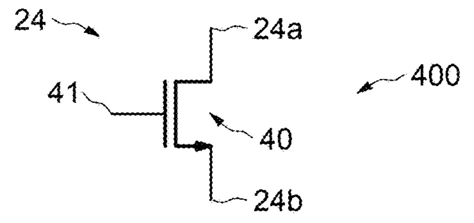
FIG. 4 illustrates schematically a first embodiment of a switch according to the invention.

FIG. 4 illustrates schematically a first embodiment of the switch 24.

The switch 24 comprises a static unidirectional switch 400.

The static unidirectional switch 400 may comprise at least one transistor 40.

The switch 24 may comprise a plurality of transistors connected in series.

The transistor 40 may be a transistor, for example an insulated-gate bipolar transistor IGBT with reverse blocking capability.

The collector of the transistor 40 is connected to the first end 24*a* of the switch 24 and the emitter of the transistor 40 is connected to the second end 24*b* of the switch 24.

The gate 41 is connected to the control means 29.

The transistor 40 may be implemented in the first embodiment of the method illustrated in FIG. 2.

During the step 32, the control means 29 command the gate of the transistor 40 to close the transistor 40 so that the energy storage device 25 supplies the DC link 8.

In the first embodiment of the method, when the energy flow supplied by the energy storage device 25 is smaller or equal to the positive predetermined value, in the step 34, the transistor 40 is opened so that no current flows through the transistor 40 following the reception of a command signal of the control means 29 on the gate of the transistor 40.

The transistor 40 is not implemented in the second embodiment of the method to control the drive system 1 illustrated in FIG. 3.

Figure 5:
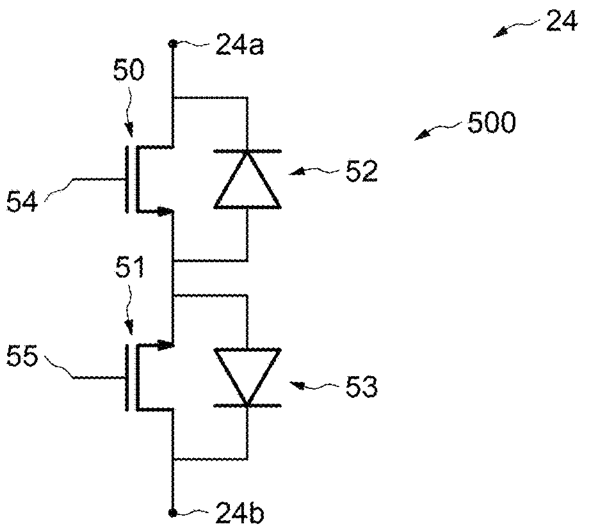
FIG. 5 illustrates schematically a second embodiment of the switch according to the invention.

FIG. 5 illustrates schematically a second embodiment of the switch 24.

The switch 24 comprises a static bidirectional switch 500 including a first transistor 50, a second transistor 51, a first diode 52 and a second diode 53.

Each transistor of the first and second transistors 50, 51 may an insulated-gate bipolar transistor IGBT.

The collector of the first transistor 50 is connected to the first end 24*a* of the switch 24 and the emitter of the first transistor 50 is connected to the emitter of the second transistor 51.

The collector of the second transistor 51 is connected to the second end 24*b* of the switch 24.

The gates 54, 55 of the first and second transistor 50, 51 are connected to the control means 29.

The cathode of the first diode 52 is connected to the first end 24*a* of the switch 24, the anode of the first diode 52 is connected to the anode of the second diode 53 and the emitter of the first transistor 50.

The cathode of the second diode 53 is connected to the collector of the second transistor 51 and to the second end 24*b* of the switch 24.

The static bidirectional switch 500 may be implemented in the first embodiment of the method illustrated in FIG. 2 and in the second embodiment of the method illustrated in FIG. 3.

In steps 30 and 31, the control means 29 command the gates 54, 55 of the first and second transistors 50, 51 to open the first and second transistors 50, 51 so that no current flows through the transistors 50, 51.

In the first embodiment of the method, during the step 32, the control means 29 command the gate 54 of the first transistor 50 to close the first transistor 50 so that the energy storage device 25 supplies the DC link 8, and the gate 55 of the second transistor 51 so that the second transistor 51 remains open.

When the energy flow supplied by the energy storage device 25 is smaller or equal to the positive predetermined value (step 33), in the step 34, the control means 29 command the gate 54 of the first transistor 50 to open the first transistor 50, and the gate 55 of the second transistor 51 so that the second transistor 51 remains open.

In the second embodiment of the method, during the step 32, the control means 29 command the gate 54 of the first transistor 50 to close the first transistor 50 and the gate 55 of the second transistor 51 to close the second transistor 51 so that the energy storage device 25 supplies the DC link 8.

When the energy flow supplied by the energy storage device 25 is equal or smaller than the negative predetermined value (step 35), in the step 36, the control means 29 command the gate 54 of the first transistor 50 to open the first transistor 50 and the gate 55 of the second transistor 51 to open the second transistor 51.

Figure 6:
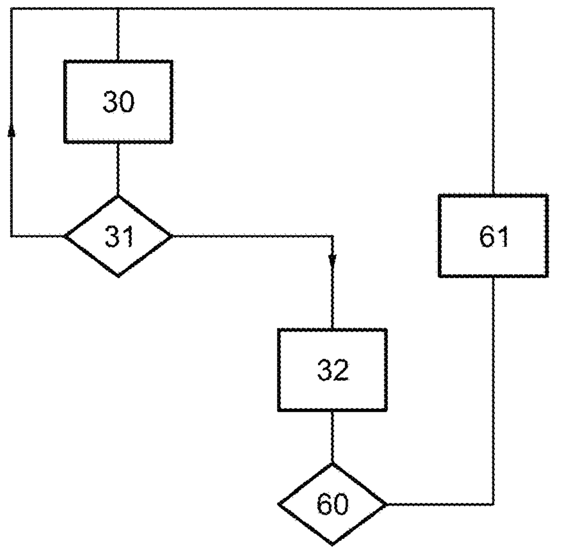
FIG. 6 illustrates schematically a third embodiment of the method to control the drive system according to the invention.

FIG. 6 illustrates a third embodiment of the method to control the drive system 1.

It is assumed that the grid G supplies the rectifier 7 through the transformer 6 with a triphasic alternating current AC and that the switch 24 is open so that no current flows through the switch 24.

The rectifier 7 rectifies the AC current and supplies the DC link 8 so that the DC voltage between the first and second bus 8*a*, 8*b* is equal to a DC nominal voltage value included between a DC minimal value and a DC maximal value, the DC maximal value being bigger than the DC minimal value.

The DC minimal value is equal to the minimal voltage value delivered by the grid G in absence of a voltage dip multiplied by the ratio of voltage transformation of the transformer 6 and the rectification factor of the rectifier 7.

The DC maximal value is equal to the maximal voltage value delivered by the grid G multiplied by the ratio of voltage transformation of the transformer 6 and the rectification factor of the rectifier 7.

The control means 29 monitor the energy flow.

Figure 7:
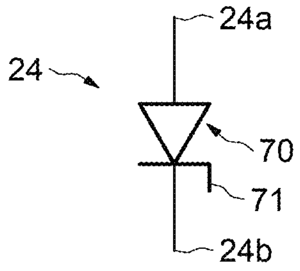
FIG. 7 illustrates schematically a third embodiment of the switch according to the invention.

In this embodiment of the method, the switch 24 comprises at least one thyristor 70 illustrated in FIG. 7.

The switch 24 may comprise a plurality of thyristors connected in series.

The anode of the thyristor 70 is connected to the first end 24*a* of the switch 24 and the cathode of the thyristor 70 is connected to the second end 24*b* of the switch 24.

The gate of the thyristor 70 is connected to the control means 29.

The third embodiment of the method comprises the steps 30, 31, 32 as described above.

During the step 32, the control means 29 command the gate of the thyristor 70 to close the thyristor 70 so that the energy storage device 25 supplies the DC link 8.

As long as a current having a positive value greater than the thyristor holding current flows from the second connection 25*b* of the energy storage device 25 to the second bus 8*b* of the DC link 8 (step 60), the thyristor 70 remains intrinsically closed.

When the current flowing from the second connection 25*b* of the energy storage device 25 to the second bus 8*b* of the DC link 8 (step 60) is smaller than the thyristor holding current, in a step 61, the thyristor 70 opens so that no current flows through the thyristor 70 and the method goes back to step 30.

The loading means 28 load the energy storage means 26 when the switch 24 is open and maintain the load of the energy storage means when the switch 24 is open so that the voltage of the energy storage means 26 is equal to the loading voltage value.

The structure of the thyristor 70 allows to command the opening of the thyristor 70 automatically without a command of the control means 29.

Figure 8:
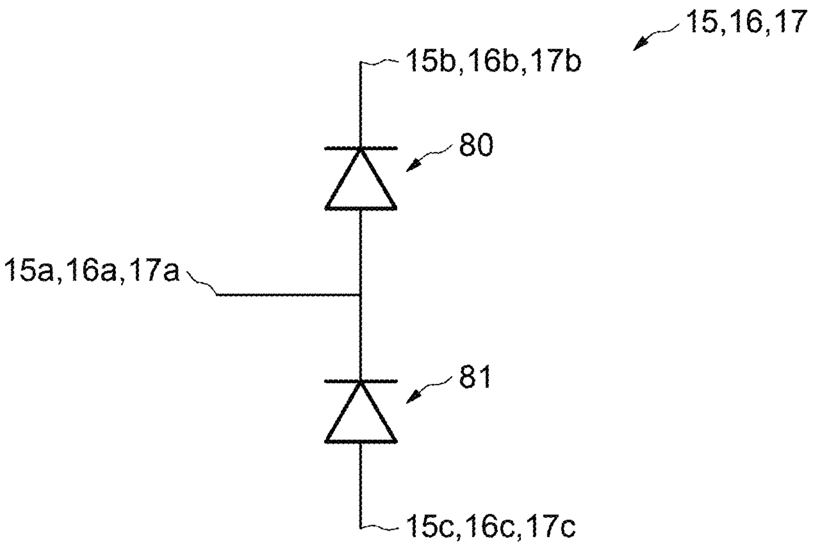
FIG. 8 illustrates schematically a first embodiment of a bridge for a rectifier according to the invention.

FIG. 8 illustrates schematically a first embodiment of the bridge 15, 16, 17 of the rectifier 7.

The rectifier 7 is a diode rectifier.

The bridge 15, 16, 17 comprises a first diode 80 and a second diode 81 connected in series.

The cathode of the first diode 80 is connected to the second connection 15*b*, 16*b*, 17*b* of the bridge 15, 16, 17, and the anode of the first diode 80 is connected to the first connection 15*a*, 16*a*, 17*a* of the bridge 15, 16, 17.

The cathode of the second diode 81 is connected to the first connection 15*a*, 16*a*, 17*a* of the bridge 15, 16, 17, and the anode of the second diode 81 is connected to the third connection 15*c*, 16*c*, 17*c* of the bridge 15, 16, 17.

The bridge 15, 16, 17 comprising the diodes 80, 81 is not commanded.

Figure 9:
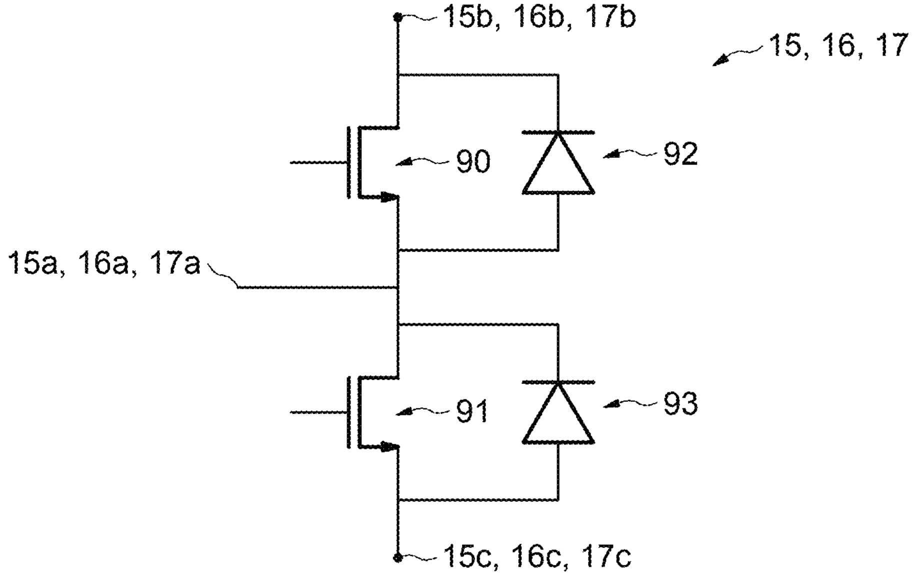
FIG. 9 illustrates schematically a second embodiment of the bridge according to the invention.

FIG. 9 illustrates schematically a second embodiment of the bridge 15, 16, 17 of the rectifier 7.

The rectifier 7 may be a controlled rectifier.

The bridge 15, 16, 17 comprises a first transistor 90 and a second transistor 91 connected in series.

The bridge 15, 16, 17 further comprises a first diode 92 and a second diode 93.

Each transistor of the first and second transistors 90, 91 may be an insulated-gate bipolar transistor IGBT.

The collector of the first transistor 90 is connected to the second connection 15*b*, 16*b*, 17*b* of the bridge 15, 16, 17, the emitter of the first transistor 90 is connected to the first connection 15*a*, 16*a*, 17*a* of the bridge 15, 16, 17.

The collector of the second transistor 91 is connected to the first connection 15*a*, 16*a*, 17*a* of the bridge 15, 16, 17, and the emitter of the second transistor 91 is connected to the third connection 15_c_, 16_c_, 17_c_ of the bridge 15, 16, 17.

The anode of the first diode 92 is connected to the first connection 15_a_, 16_a_, 17_a_ of the bridge 15, 16, 17 and the cathode of the first diode 92 is connected to the second connection 15_b_, 16_b_, 17_b_ of the bridge 15, 16, 17.

The anode of the second diode 93 is connected to the to the third connection 15_c_, 16_c_, 17_c_ of the bridge 15, 16, 17 and the cathode of the second diode 93 is connected to the first connection 15_a_, 16_a_, 17_a_ of the bridge 15, 16, 17.

The gate of the first and second transistors 90, 91 is connected to a control unit of the VFD 2 (not represented).

Figure 10:
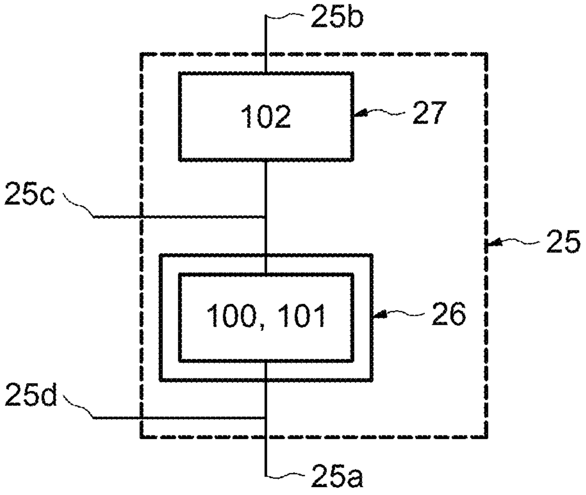
FIG. 10 illustrates an embodiment of an energy storage device according to the invention.

FIG. 10 illustrates schematically another embodiment of the energy storage device 25.

The energy storage means 26 comprise at least one capacitor 100 or at least one battery 101.

As the embedded impedance of the capacitor 100 or the battery 101 is too low to limit the inrush current to the chosen inrush current value, an impedance 102 is connected in series with the capacitor 100 or the battery 101, the impedance 102 being the additional impedance 27.

A first end of the impedance 102 is connected to the third connection 25_c_ of the energy storage device 25 and the second end of the impedance 102 is connected to the second connection 25_b_ of the energy storage device 25.

In another embodiment, the first end of the impedance 102 is connected to the fourth connection 25_d_ of the energy storage device 25 and the second end of the impedance 102 is connected to the first connection 25_a_ of the energy storage device 25.

The invention claimed is:

1. A method for supplying a variable frequency drive comprising a DC link including a first bus and a second bus, and a power inverter connected to the DC link, a power supply device comprising (i) a switch and (ii) an energy storage device, the energy storage device including an additional impedance and an energy storage means and (iii) a a power converter configured to directly deliver a DC current to load the energy storage means;

wherein a first connection of the energy storage device is connected to the first bus, a second connection of the energy storage device is connected to a first end of the switch, and a second end of the switch is connected to the second bus;

wherein the DC link supplies the power inverter with a DC voltage equal to a DC nominal voltage value included between a DC minimal value and a DC maximal value, the DC maximal value being bigger than the DC minimal value, the switch being open so that no current flows through the switch; and wherein the method comprises:

loading, via the power converter, the energy storage means when the switch is open so that the voltage of the energy storage means is equal to a loading voltage value equal to the sum of the DC maximal value and a voltage threshold;

maintaining, via the power converter, the load of the energy storage means when the switch is open so that the voltage of the energy storage means is equal to the loading voltage value; and closing the switch when the DC link voltage is equal or smaller than the DC minimal value minus a predetermined voltage value to supply the DC link with an energy flow from the energy storage device, the energy flow value being positive as long as the energy storage device supplies the DC link.

2. The method according to claim 1, comprising opening the switch when the energy flow supplied by the energy storage device is smaller or equal to a positive predetermined value.

3. The method according to claim 1, comprising opening the switch when the energy flow supplied by the energy storage device is equal or smaller than a negative predetermined value.

4. A power supply device for variable frequency drive comprising a power inverter connected to a DC link, the DC link including a first bus and a second bus and being configured to supply the power inverter with a DC voltage equal to a DC nominal voltage value included between a DC minimal value and a DC maximal value, the DC maximal value being bigger than the DC minimal value, the power supply device comprising:

a switch and an energy storage device, the energy storage device including an additional impedance, and an energy storage means, and a first connection of the energy storage device being configured to be connected to the first bus and a second connection of the energy storage device being connected to a first end of the switch, the second end of the switch being configured to be connected to the second bus, the power supply device further comprises:

a power converter configured to directly load the energy storage means when the switch is open so that the voltage of the energy storage means is equal to a loading voltage value equal to the sum of the DC maximal value and a voltage threshold, and maintain the load of the energy storage means when the switch is open so that the voltage of the energy storage means is equal to the loading voltage value, and a control means configured to close the switch when the DC link voltage is equal or smaller than the DC minimal value minus a predetermined voltage value to supply the DC link with an energy flow from the energy storage device, the energy flow value being positive as long as the energy storage device supplies the DC link.

5. The power supply device according to claim 4, wherein the switch is configured to be opened when the energy flow supplied by the energy storage device is smaller or equal to a positive predetermined value.

6. The power supply device according to claim 5, wherein the switch is configured to be opened when the energy flow supplied by the energy storage device is equal or smaller than a negative predetermined value.

7. The power supply device according to claim 6, wherein the switch comprises a static bidirectional switch.

8. The power supply device according to claim 5, wherein the switch comprises a static unidirectional switch.

9. The power supply device according to claim 4, wherein the switch comprises at least one thyristor, the anode of the thyristor being connected to the first end of the switch and the cathode of the thyristor being connected to the second end of the switch.

10. The power supply device according to claim 9, wherein the energy storage device comprises a supercapacitor.

11. The power supply device according to claim 9, wherein the energy storage means comprises at least one capacitor connected in series with the additional impedance.

12. The power supply device according to claim 9, wherein the energy storage means comprises at least one battery connected in series with the additional impedance.

13. A variable frequency drive comprising:

a power inverter connected to a DC link, the DC link including a first bus and a second bus and being configured to supply the power inverter with a DC voltage equal to a DC nominal voltage value included between a DC minimal value and a DC maximal value, the DC maximal value being bigger than the DC minimal value, and a power supply device according to claim 12, connected to the first bus and a second bus.

14. The variable frequency drive according to claim 13, further comprising a rectifier configured to be connected to a grid and connected to the DC link to supply the DC link with the DC voltage.

15. A drive system comprising:

a variable frequency drive according to claim 14, and an electric machine connected to the power inverter of the variable frequency drive.

* * * * *